(12) United States Patent
Sano et al.

(10) Patent No.: US 6,429,617 B1
(45) Date of Patent: Aug. 6, 2002

(54) DRIVE-CONTROLLING METHOD AND APPARATUS AND ROBOT HAVING THE APPARATUS

(75) Inventors: Masatoshi Sano, Kakogawa; Tsuyoshi Maehara, Itami; Tetsuhiko Nishimura, Akashi; Hiroaki Kagaya, Noda; Naoyuki Matsumoto, Akashi, all of (JP)

(73) Assignee: Kawasaki Jukogyo Kabushiki Kaisha (JP)

( * ) Notice: Subject to any disclaimer, the term of this patent is extended or adjusted under 35 U.S.C. 154(b) by 0 days.

(21) Appl. No.: 09/692,870

(22) Filed: Oct. 20, 2000

(30) Foreign Application Priority Data

Oct. 22, 1999 (JP) .......................... 11-300377

(51) Int. Cl.[7] .............................. G05B 11/01
(52) U.S. Cl. ................. 318/560; 318/568; 318/572; 318/573; 318/568.1; 318/568.13; 318/568.11
(58) Field of Search ................. 318/568, 572, 318/573, 568.1, 568.13, 568.11; 701/301, 560

(56) References Cited

U.S. PATENT DOCUMENTS

| | | | |
|---|---|---|---|
| 5,570,285 A | * | 10/1996 | Asaka et al. ........... 364/424.02 |
| 5,920,678 A | * | 7/1999 | Watanabe et al. ............ 318/568 |
| 6,049,756 A | * | 4/2000 | Libby ........................ 318/587 |

FOREIGN PATENT DOCUMENTS

| | | |
|---|---|---|
| EP | 0 188 109 A2 | 7/1986 |
| EP | 0 639 888 A1 | 2/1995 |
| JP | 5-208394 | 8/1993 |
| JP | 7-143780 | 6/1995 |
| JP | 8-66893 | 3/1996 |
| JP | 8-229864 | 9/1996 |
| JP | 11-70490 | 3/1999 |

OTHER PUBLICATIONS

JP 110245191 A (Nachi Fujikoshi Corp) see WPI abstract accession No. 1999–565651 [48] and PAJ abstract vol. 199914.
JP 070306706 A (Toyota Auto Loom Works Ltd) see PAJ abstract vol. 199603.
JP 030003687 A (Fanuc Ltd.) see PAJ abstract vol. 015110.
JP 610131001 A (Toyota Motor Corp) see PAJ abstract vol. 010324.

* cited by examiner

Primary Examiner—Karen Masih
(74) Attorney, Agent, or Firm—Marshall, Gerstein & Borun (57) ABSTRACT

Provided is a drive-controlling method and apparatus and a robot having the apparatus for precisely detecting a collision of a arm being driven by a robot with obstacles, and for keeping damages of the arm from the collision minimum: storing a route of the arm being driven by the robot in a memory; detecting a collision by comparing a current value of a servo motor which drives the arm and a reference current value; and controlling the robot such that the arm leaves a predetermined distance from the obstacle based on the stored route, backing up the arm along the same route as before the collision.

12 Claims, 8 Drawing Sheets

DRIVE-CONTROLLING METHOD AND APPARATUS AND ROBOT HAVING THE APPARATUS

BACKGROUND OF THE INVENTION

The present invention relates to a drive-controlling method for detecting a collision of a driven member, such as a hand or various tool(s), attached onto an arm of a robot serving as a driver with obstacles, and which controls to keep damages of the members from the collision minimum, and the present invention also relates to an drive-controlling apparatus using the method and a robot having the apparatus.

Conventionally, various suggestions have been made for technologies in collision detection of movable parts of an industrial robot with an obstacle during operation. For example, a method for detecting a collision based on waggles of signals from a torque sensor attached on a motor which drives an arm of a robot is disclosed in Japanese Patent Application Laid-Open H5-208394 (1993).

Another method is disclosed in Japanese Patent Application Laid-Open H8-66893 (1996) and Japanese Patent Application Laid-Open H11-70490 (1999). The method is such a way that a disturbance of torque sustained by a servo motor which drives a robot arm is estimated by using an observer.

Still another method is disclosed in Japanese Patent Application Laid-Open H8-229864 (1996). The method is such a way that a collision is detected based on a deviation (or an actual deviation) between an instructed position of a movable part of a robot given by a robot controller and an actual position. More particularly, the method is to calculate a logical deviation of position based on a delay time of control system of the robot, and to detect a collision based on a result of comparison between the logical deviation and the above actual deviation.

Other method for procedures after the collision detection is disclosed in Japanese Patent Application Laid-Open H7-143780 (1995). The method is such a way that a torque is loaded in a direction opposite to that of driving of a motor when a collision is detected so that it cuts down a time between the detection of the collision and a moment at which the collided part of the robot is stopped.

As mentioned above, various suggestions of technologies in detecting a collision of the movable part of the robot with the obstacles and in stopping the collided part of the robot after the collision is detected have been made conventionally. However, those suggestions are not sufficient in terms of reducing the degree of damage which the members suffer from the collision. In other words, since just stopping the robot, after the collision is detected, only results in the movable part of the robot pushing against the obstacle for a certain time, it cannot reduce the impact of the collision. Therefore, it is difficult to minimize the damage which the members suffer from the collision.

BRIEF SUMMARY OF THE INVENTION

The present invention has been made with the aim of solving the above problems, and it is an object of the present invention to provide a drive-controlling method for precisely detecting a collision of a driven member being driven by a driver such as a robot with an obstacle, and for keeping damages of the members from the collision minimum, and to provide a drive-controlling apparatus using the method and a robot having the apparatus.

The drive-controlling method of the present invention for detecting a collision of a driven member being driven by a driver with a obstacle, and for controlling to subdue a damage of the driven member suffered from the collision, is characterized in that it comprises steps of: storing a driving route of the driven member; and controlling the driver such that the driven member leaves a predetermined distance from the obstacle based on the stored driving route of the driven member before the collision is detected.

The drive-controlling apparatus of the present invention for detecting a collision of a driven member being driven by a driver with an obstacle, and for controlling to subdue a damage of the driven member suffered from the collision, is characterized in that it comprises: a route storing memory for storing a driving route of the driven member; and a controller for controlling the driver such that the driven member leaves a predetermined distance from the obstacle based on the stored driving route of the driven member before the collision is detected.

Therefore, the driven member (movable part) of the driver (robot) is not kept pushing against the obstacle when the driven member collided with the obstacle and thus a damage which the member suffers from the collision is minimized.

In the above invention, a reference level of detecting the collision of the driven member with the obstacle may be set based on operational data of the driver which is obtained by actually driving the driven member. Therefore, accurate collision detection is made possible in accordance with actual operational environment of the driver.

In the above invention, in the case that the driven member is a robot arm, it may be considered that the collision is detected when a current value or a rate of change in the current value of a servo motor driving the arm exceeds the reference level.

In the above invention, in the case that the arm have a plurality of axes which are driven by independent servo motors, each axis may be driven either under a reversing process or a forwarding process when the collision is detected. The reversing process is to drive corresponding axes to a direction opposite to the direction before the detection of the collision. The forwarding process is to drive corresponding axes to a direction same as the direction before the detection of the collision. Here, a comparison is made between a logical current value of the corresponding servo motor and a resultant in which the logical current value is subtracted by an actual current value of the servo motor. If those two values show opposite sign, the reversing process is executed; and if those two values show the same sign, the forwarding process is executed.

Therefore, since the axes which are driving the driven member in a direction away from the obstacle when a collision is occurred is controlled to be driven in the same direction, it is possible to avoid aggravating a degree of damage, for example, which is suffered from re-pushing the driven member against the obstacle when reversing the driving direction of the axes toward the obstacle.

In the above invention, the above mentioned reversing process may be to control the arm to leave from the obstacle for a predetermined distance back along a predetermined section of the route.

In the above invention, the predetermined distance may be set to be constant nevertheless of a speed of the driven member before the collision is detected.

In the above invention, the apparatus is explained as if independent from the robot or the arm thereof; however the apparatus may be included in the robot.

DETAILED DESCRIPTION OF THE INVENTION

The present invention will now be described in detail referring to the accompanying drawings illustrating the embodiment thereof. However the present invention is not limited to the embodiment hereinbelow.

Figure 1:
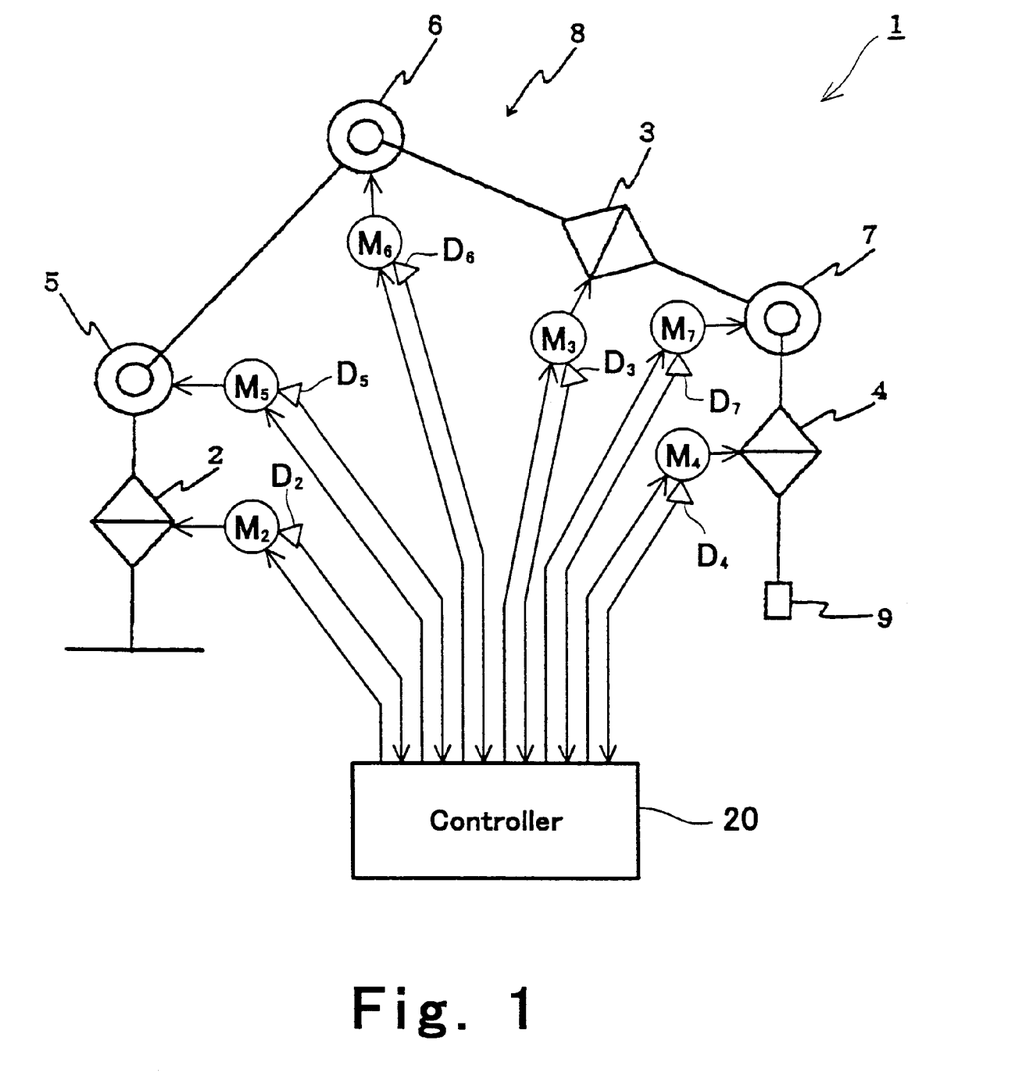
FIG. 1 is a schematic diagram showing a robot arm according to an embodiment of the present invention.

FIG. 1 schematically shows a robot having a drive-controlling apparatus adopting a drive-controlling method according to an embodiment of the present invention, by using graphic symbols which shows operational functions thereof.

The robot 1 serving as a driver has an arm 8 with six degrees of freedom, that is, the arm 8 includes a first, second, and third axes 2, 3, and 4 serving as rotational axes; and a fourth, fifth, and sixth axes 5, 6, and 7 serving as pivots. At a tip portion of the arm 8 an end effector 9, which serves as a driven member such as a welding tool, is attached thereto. The axes 2, 3, 4, 5, 6, and 7 are constituted such that they are independently driven by a servo mechanism (not shown) including corresponding servo motors $M_2$, $M_3$, $M_4$, $M_5$, $M_6$, and $M_7$ (shown as "M" in the Figure).

A Position instructing value $\theta(i)$, i=1, 2, 3, 4, 5, and 6, is given to the servo mechanism from a robot controller 20 to give an instruction of position for each of the first through sixth axes 2, 3, 4, 5, 6, and 7, respectively, at time t. And then the servo mechanism drives each of the axes 2, 3, 4, 5, 6, and 7 such that actual positions of the axes 2, 3, 4, 5, 6, and 7 match with the positions represented by the position instructing values $\theta(i)$.

Next, a "Collision Detection Process" to detect a collision of the end effector 9 with an obstacle such as a work or a jig will be explained. Generally, a dynamic equation of a robot is represented by the equation (1) below if the plasticity of robot joints is ignored:

$$J(\theta) \cdot d2\theta/dt^2 + C(d\theta/dt, \theta) + P(\theta) + D \cdot d\theta/dt + E(d\theta/dt, \theta) = \tau \quad (1)$$

Here, the "$\theta$" is a variable indicative of a position of each axes of the robot at time t. "$d\theta/dt$" is a first derivative of the variable $\theta$, which means it is a velocity of each of the axes in time t. "$d^2\theta/dt^2$" is a second derivative of the variable $\theta$, which means it is an acceleration of each of the axes in time t.

Furthermore, "$\tau$" represents a torque (hereinafter, it will be referred as a "logical torque"), "$J(\theta)$" represents an inertia force of each of the axes, "$C(d\theta/dt, \theta)$" represents a centrifugal force and Coriolis force, "$P(\theta)$" represents a gravitational force, "$D \cdot d\theta/dt$" represents a viscous frictional force, and "$E(d\theta/dt, \theta)$" in those above represents a Coulomb frictional force and a static position.

Figure 2:
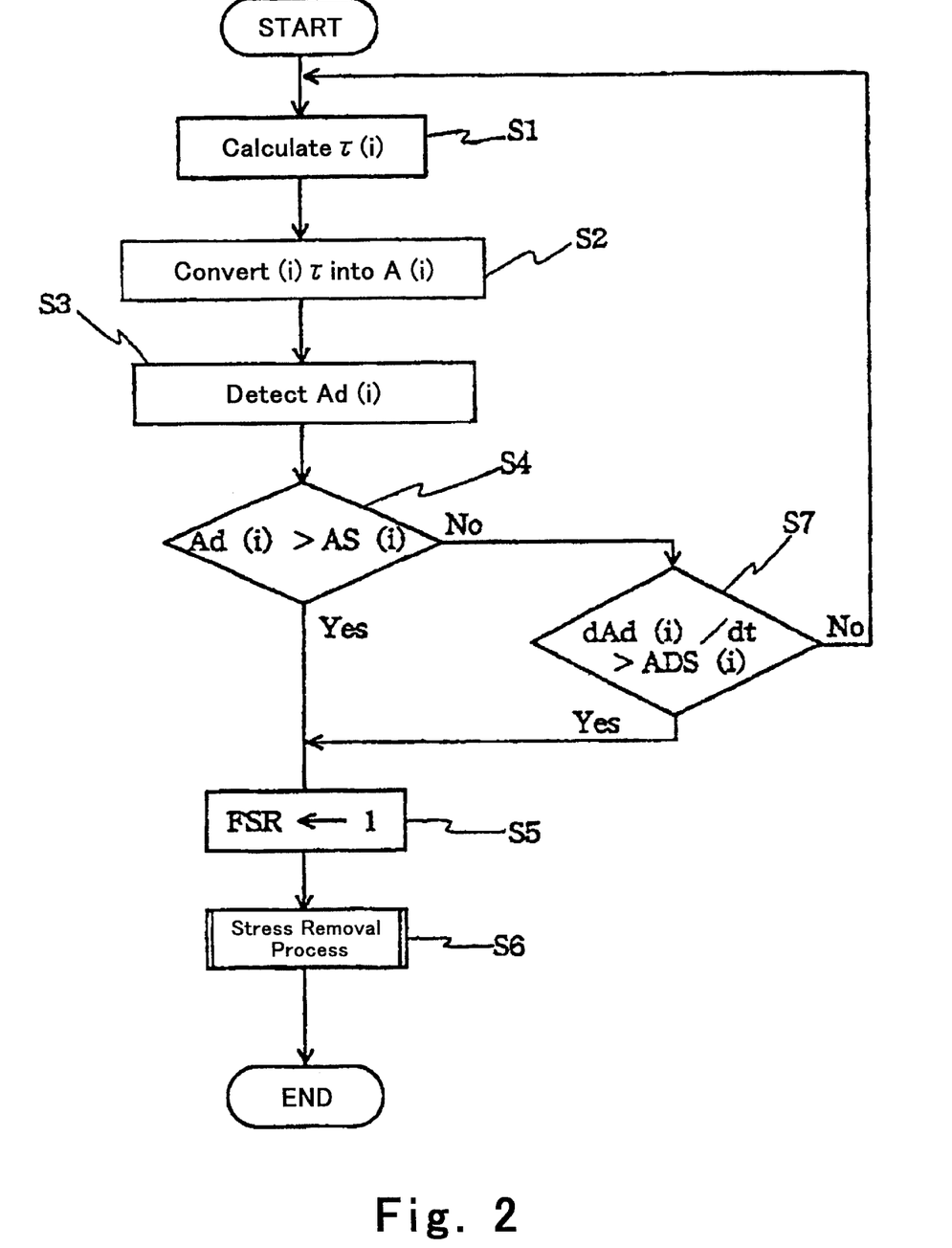
FIG. 2 is a flowchart showing sequential procedures of "Collision Detection Process" of the robot according to the embodiment of the present invention.

FIG. 2 is a flowchart showing sequential procedures of "Collision Detection Process" for detecting a collision of the end effector 9 with the obstacle. This process is repeatedly executed by the robot controller 20 at, for example, every 20 msec, synchronized with a cyclic period mt at which the robot controller 20 transmits the position instructing value $\theta(i)$.

First of all, the position instructing value $\theta(i)$ is substituted into the variable $\theta$ of the above mentioned equation (1). Here, "i" represents a number given to each axis, that is, it would be as i=1, 2, 3, 4, 5, and 6. By the substitution, a logical torque $\tau(i)$ at a time t is calculated for each of the first through sixth axes 2, 3, 4, 5, 6, and 7, respectively (Step S1). Also, a current A(i) which is required for each of the servo motors $M_2$, $M_3$, $M_4$, $M_5$, $M_6$, and $M_7$ to generate a torque corresponding to the value $\tau(i)$, hereinafter the current is referred as a "logical current value", is calculated (Step S2).

For the next, a current Ar(i) which is actually flowing in each of the servo motors $M_2$, $M_3$, $M_4$, $M_5$, $M_6$, and $M_7$ driving the corresponding axis (i) is detected by corresponding sensors $D_2$, $D_3$, $D_4$, $D_5$, $D_6$, and $D_7$, and then a current difference value Ad(i) indicative of the absolute value of the difference between the values A(i) and Ar(i) by equation (2) below (Step S3):

$$Ad(i) = abs(A(i) - Ar(i)) \quad (2)$$

Moreover, it is determined whether or not that the current difference value Ad(i) is larger than a first reference value AS(i) which is set for each of axes 2, 3, 4, 5, 6, and 7 (Step S4). If the value Ad(i) is larger than the value AS(i), it is considered as a collision is occurred; therefore a collision detection flag FSR is set to a value "1" to indicate that the collision is detected (Step S5). After that, a "Stress Removal Process" is executed (Step S6) and then the whole process is terminated.

The above mentioned "Stress Removal Process" is designed to remove stress occurring between the driven member and the obstacle due to the collision; however, more detail thereof will be mentioned below.

In the meanwhile, in the case that the value Ad(i) is not larger than the value AS(i) at Step S4, furthermore, it is determined whether or not that a differential current difference value dAd(i)/dt, which is a derivative of the current difference value Ad(i), namely, a deviating speed of the current difference value Ad(i), is larger than a second reference value ADS(i) which is set for each of axes 2, 3, 4, 5, 6, and 7 (Step S7). If the value dAd(i)/dt is larger than the value ADS(i), it is considered as a collision is occurred, therefore Steps 5 and 6 are accordingly executed. However, if the value dAd(i)/dt is not larger than the value ADS(i), it is considered as a collision is not occurred and the process is returned to "START."

As mentioned above, since the drive-controlling method of this embodiment is configured such that the collision detector detects a collision of the end effector 9 with the obstacle based upon values Ar(i) of current supplying to the servo motors $M_2$, $M_3$, $M_4$, $M_5$, $M_6$, and $M_7$ driving each of axes 2, 3, 4, 5, 6, and 7 which constitutes the arm 8 of the robot 1, a torque sensor or an observer can be omitted and thus it is possible to simplify overall configuration.

Moreover, when either the deviation of the current difference value Ad(i) or the differential current difference value dAd(i)/dt indicative of deviating speed thereof is larger than reference value AS(i) or ADS(i), predetermined respectively, it is judged that a collision is occurred. Therefore, it is possible that the collision can be detected more promptly and more precisely nevertheless of the driving speed of the driven member.

Next, methods for setting the first and second reference values AS(i) and ADS(i) will be explained.

(1) Manual Setting

A command for setting the first and second reference values AS(i) and ADS(i) is added to a robot language. Here, it can raise a sensitivity of the collision detection if the reference values AS(i) and ADS(i) are set to be small. However, if the values are too small, it increases detection errors and thus it derogates detection reliability. An example of the error is that waggling of the driving current due to some electrical noises is judged as the occurrence of the collision. On the other hand, if the values are too large, it decreases the sensitivity of the collision detection, and then it results in delaying the collision detection itself. Therefore, to promptly and accurately execute the collision detection, the above mentioned reference values AS(i) and ADS(i) need to be set at certain proper values. Although, manually setting those reference values AS(i) and ADS(i) for every single manufacturing process done by the robot under a wide variety of task conditions is almost impossible.

(2) Auto Setting

Accordingly, in the present embodiment, first of all, some specific tasks are given to the robot 1 and then the robot 1 studies the maximum torques generated at each of the axes 2, 3, 4, 5, 6, and 7 while each movement following the given tasks. The robot 1 is adopted a kind of command in the robot language thereof such that it sets the reference values AS(i) and ADS(i) based on the studied maximum torques. Therefore, setting of the reference values AS(i) and ADS(i) is appropriately made in accordance with actual movements or conditions of the robot 1 to accurately execute the collision detection.

Figure 3:
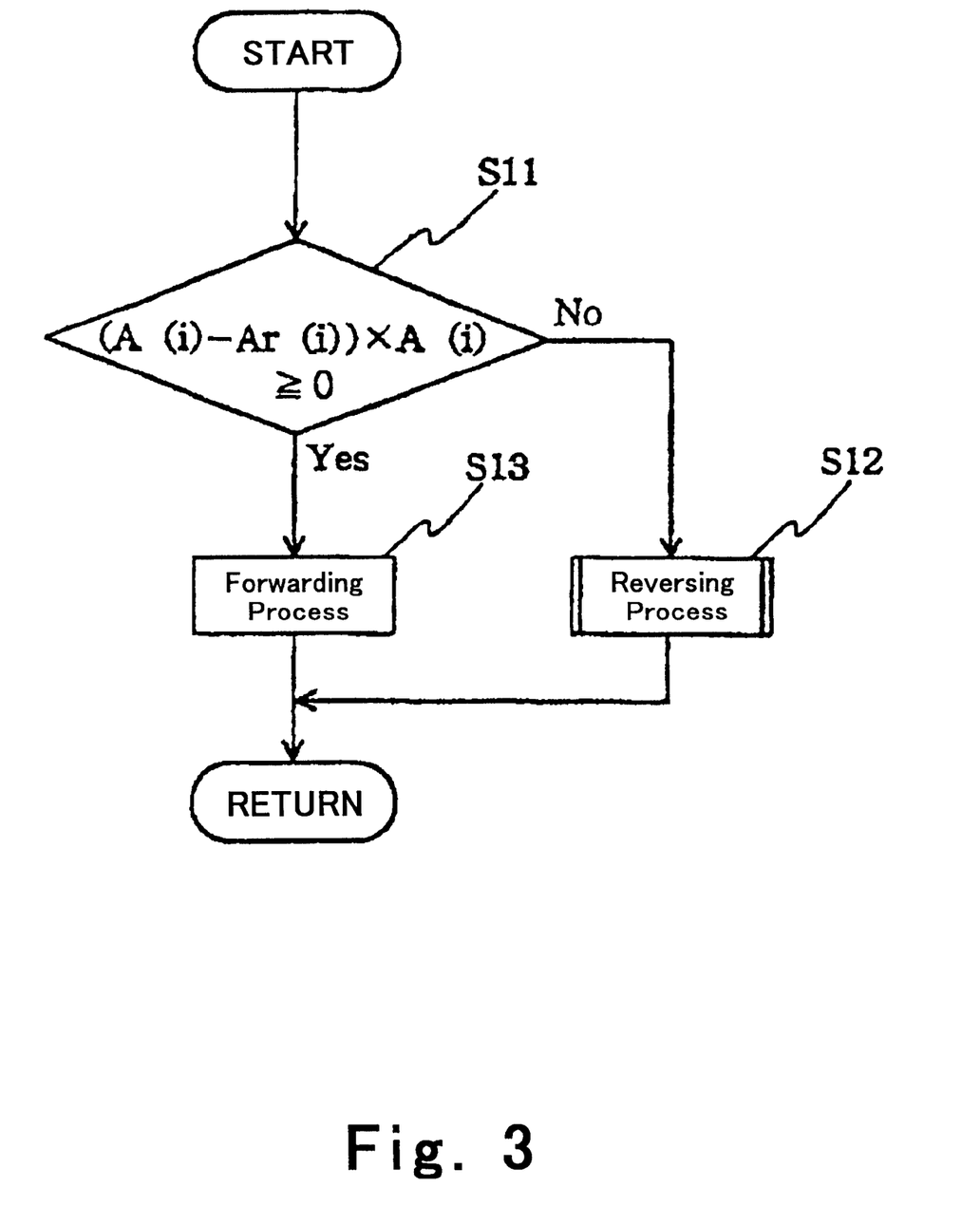
FIG. 3 is a flowchart showing sequential procedures of "Collision Process" of each axis of the robot arm according to the embodiment of the present invention.

Next, the "Stress Removal Process" which is executed at the above mentioned Step S6 of FIG. 2 will be explained referring FIG. 3.

Theoretically, the "Stress Removal Process" is designed to drive the driven member to leave away from the obstacle back along the same route before the collision is detected so that the servo mechanism drives each of the axes 2, 3, 4, 5, 6, and 7. This leaving away movement is particularly referred as "Escape Movement" hereinafter.

More particularly, at first, a value (=A(i)−Ar(i)) which is a subtracted result of the actual current value Ar(i) from the logical current value A(i) is determined whether or not it shows a positive value or negative value (Step S11). If this subtracted value "A(i)−Ar(i)" shows different sign, "+" or "−", it is considered that the axis (i) had been driving the driven member toward the obstacle when the collision was occurred. Therefore, the "Reversing Process" for reversing the driving direction of the driven member by the axis (i) is executed (Step S12). Note that these steps are executed for each of the axes 2, 3, 4, 5, 6, and 7 and the "Reversing Process" will be further described in detail below.

Meanwhile, if the above subtracted value "A(i)−Ar(i)" shows the same sign, it is considered that the axis (i) had been driving the driven member away from the obstacle when the collision was occurred. Therefore, the "Forwarding Process" for sustaining driving direction of the axis (i) to the same direction as before with same speed or same acceleration, without reversing, is executed (Step S13).

Figure 4:
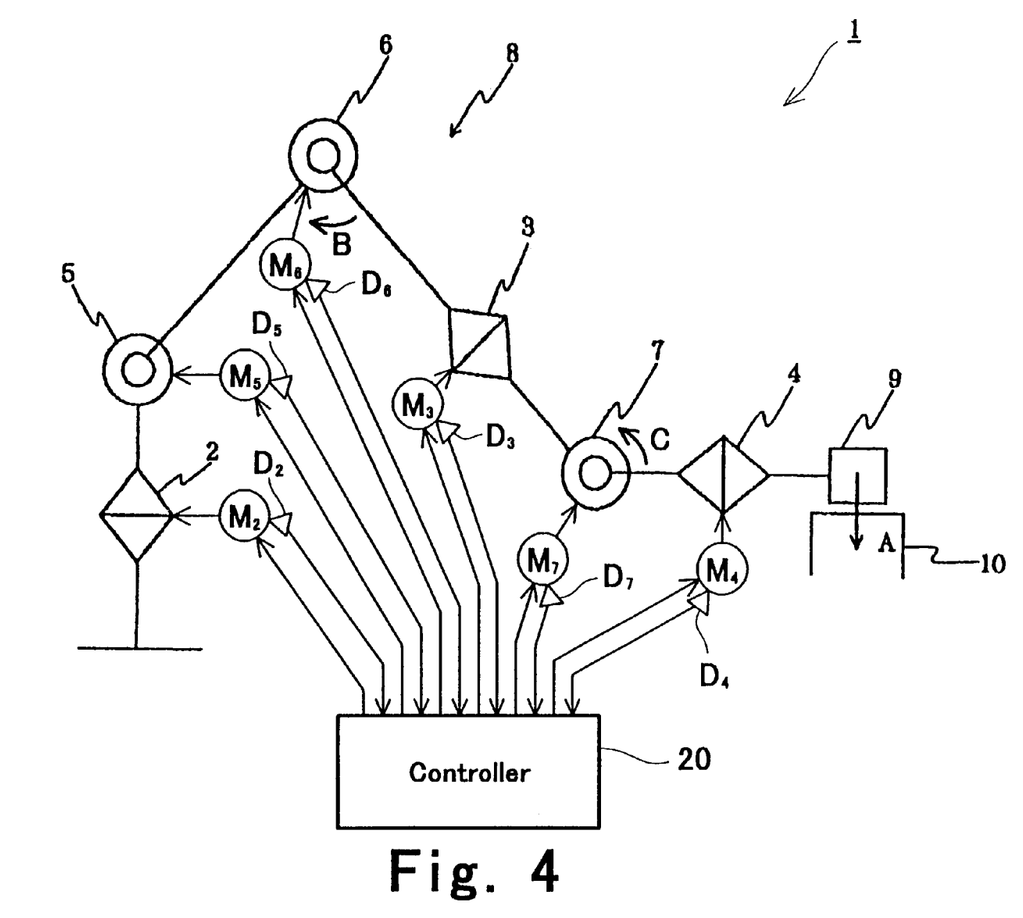
FIG. 4 is a view for supplementary explaining the "Collision Process" of each axis of the robot arm according to the embodiment of the present invention.
Figure 5:
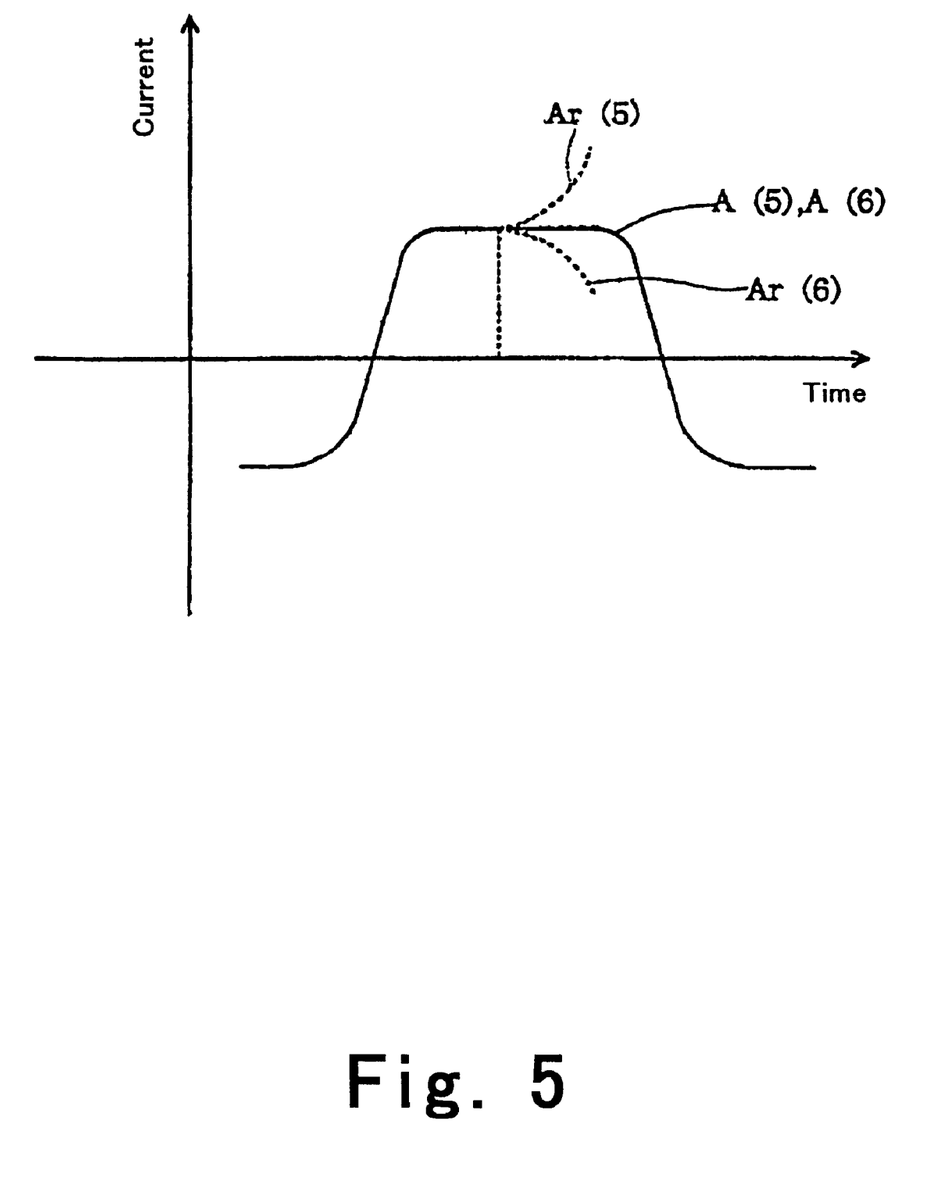
FIG. 5 is a view for supplementary explaining the "Collision Process" of each axis of the robot arm according to the embodiment of the present invention.

For example, as shown in FIG. 4, in the case that the end effector 9 is linearly moved toward a direction indicated by "A" in the Figure, the fifth axis 6 is rotated toward a direction indicated by "B" and the sixth axis 7 is rotated toward a direction indicated by "C" in the Figure. In this case, when the end effector 9 is collided with an obstacle 10, the fifth axis 6 is suffering a load toward the direction opposite to driving thereof from the collision. Accordingly, a load on the servo motor $M_6$ which drives the axis 6 is increased, and thus the actual current value Ar(5) supplying to the servo motor $M_6$ is also increased comparing with the logical current value A(5) (see FIG. 5).

On the other hand, the sixth axis 7 is loaded toward the same direction as that of driving thereof due to the collision with the obstacle 10. Accordingly, a load on the servo motor $M_7$ which drives the axis 7 is decreased, and thus the actual current value Ar(6) supplying to the servo motor $M_7$ is also decreased comparing with the logical current value A(6).

In this way, which direction the driven member has been driven, that is, either toward the obstacle 10 or away from the obstacle 10, can be determined for each of the axes 2, 3, 4, 5, 6, and 7 when the collision was occurred, based upon comparison of the values between the actual current value Ar(i) and logical current value A(i) and the sign of the logical current value A(i). Therefore, it is possible to avoid aggravating a degree of damage, for example, which is suffered from re-pushing the driven member against the obstacle 10 when reversing a driving direction of a axis which is driven in a direction away from the obstacle 10 as the collision is occurred, by means of sustaining the driving of the driven member in the same direction with same speed or acceleration.

Next, the "Reversing Process" which is executed at the above mentioned Step S13 of FIG. 3 will be explained referring FIGS. 6 through 8. Here, the "Reversing Process" includes a "Route Storing Process" for storing a route up to the collision occurrence and an "Escape Movement Process."

Figure 6:
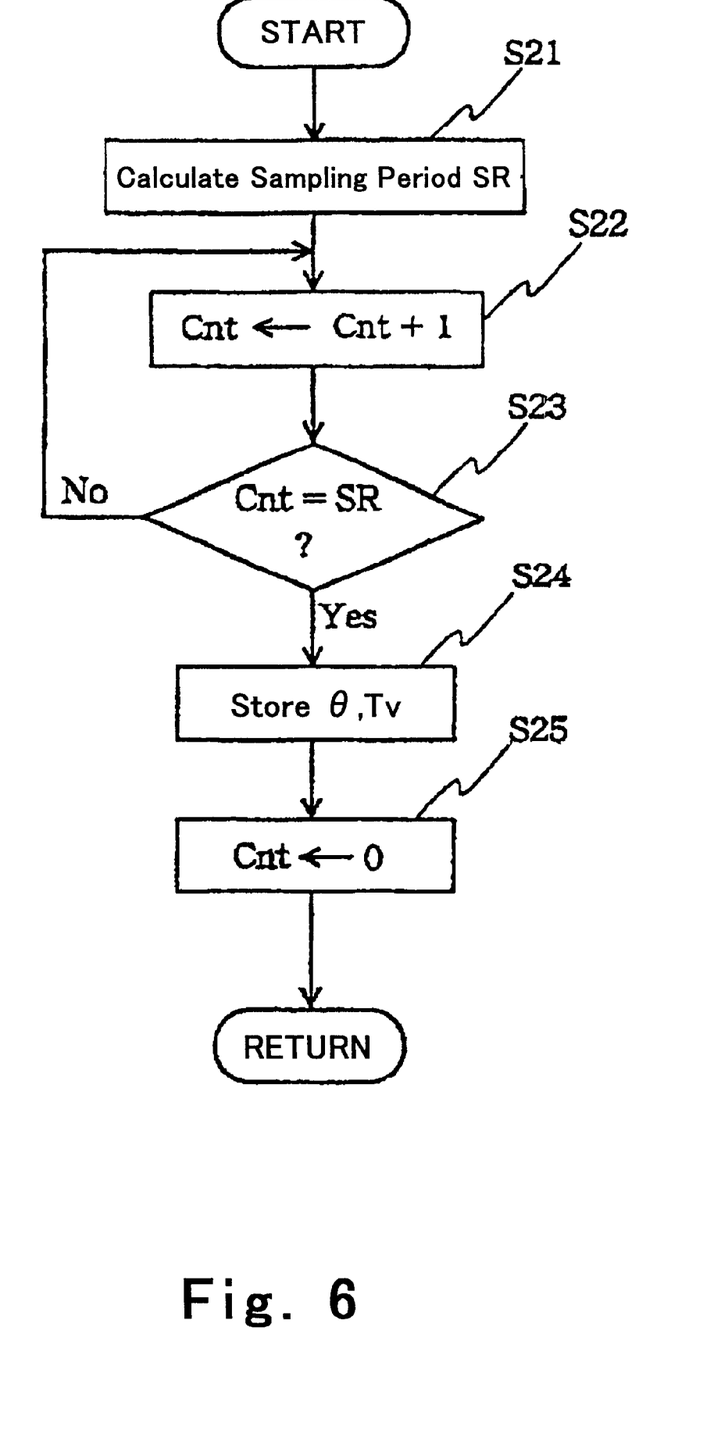
FIG. 6 is a flowchart showing sequential procedures of "Route Storing Process" of the robot according to the embodiment of the present invention.

FIG. 6 is a flowchart showing a procedure of the "Escape Movement Process." This process is repeatedly executed background during the operation of the robot 1 all the time, synchronized with a timing that the robot controller 20 transmits the position instructing value ((i) to the servo mechanism.

First, according to the equation (2) below, a sampling period SR for storing the position instructing value θ(i) transmitted from the robot controller 20 and moving speed of the driven member (Step S21).

$$SR = L/Tv \qquad (3)$$

Here "L" is a constant which is set in accordance with a distance of the driven member to be driven during the "Stress Removal Process" (i.e., 50 mm). "Tv" should be a variable proportional to speed of the driven member (hereinafter, referred to as "tool speed"); however, here, it indicates a distance that the driven member is moved during a single period while the robot controller 20 transmits the position instructing value θ(i).

Next, a counter value Cnt is added by an increment value "1" (Step S22), and then it is determined whether or not the added counter value Cnt is equal to the sampling period SR (Step S23). If the counter value Cnt is not equal to the sampling period SR, it is returned to Step S22. In the meanwhile, if the counter value Cnt is equal to the sampling period SR, the position instructing value θ(i), a value of the tool speed Tv, and a value of the sampling period SR at time t are stored in a memory device (hereinafter, which may be referred to as just a "memory"; See FIG. 8) provided in the robot controller 20 (Step S24).

Here, in the storing scheme of each data of the position instructing value θ(i) and the value Tv, it is configured such that it divides the memory area as corresponding to a step number $t_s$ required for the "Escaping Movement", and stores position instructing values $θt_j(i)$, tool speed $Tv_j$, and sampling period $SR_j$ corresponding to each of the axes 2, 3, 4, 5, 6, and 7 into the divided memory areas, respectively, where j=1, 2, 3, . . . , $t_s$. By the way, when "j=n" indicates the newest data, "j=n+1" indicates the oldest data, for applying ring buffers based on "j" value to the memory areas. At this moment, value "j" is added by a value "1" so as to store the θ(i), Tv, and SR in the (j+1)th buffer at the next sampling.

Referring back to FIG. 6, when the Step S24 is finished, counter value Cnt is reset (Step S25), and then it is returned to "START."

As described above, by sampling the position instructing value θ(i) of each of the axes 2, 3, 4, 5, 6, and 7 at the sampling period SR which is set so as to be inversely proportional to the tool speed TV, driving distance of the driven member under the stress removal movement despite of the driving speed of the driven member at the collision can be set approximately constant.

Figure 7:
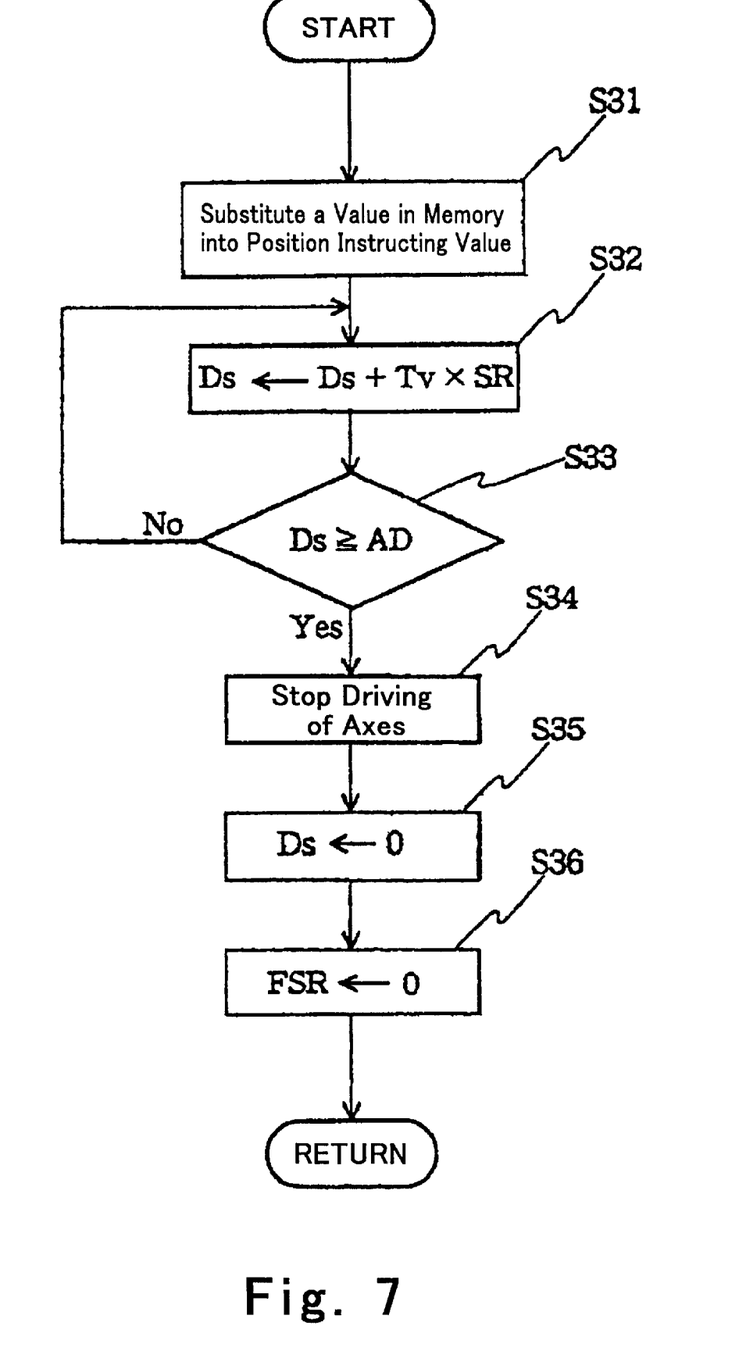
FIG. 7 is a flowchart showing sequential procedures of "Escape Movement Process" of the robot according to the embodiment of the present invention.

Next, the "Escape Movement Process" referring FIG. 7. This process is executed at the same period m as a period at which the robot controller 20 transmits the position instructing value θ(i) to the servo mechanism, just after the detection of the collision.

Figure 8:
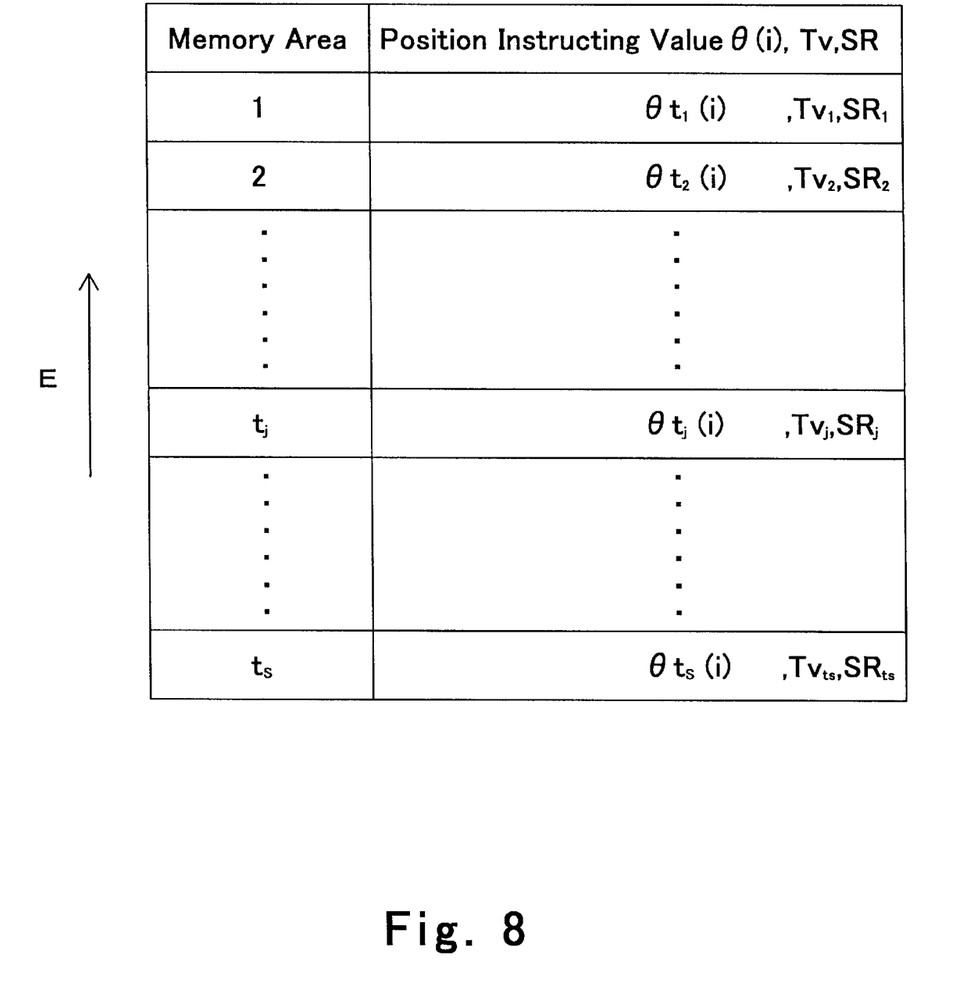
FIG. 8 is a table showing stored data in a memory during the "Route Storing Process."

At first, the data stored in the memory is read out one by one as from the newest one stored just before the detection of the collision ($θt_n(i)$, $Tv_n$, and $SR_n$, stored in the memory areas $T_n$ of FIG. 8) toward older direction (a direction indicated by an arrow "E" in the Figure) at each time this process is executed. The read-out data is transmitted to the servo mechanism as the position instructing value θ(i) for instructing positions of each of the axes 2, 3, 4, 5, 6, and 7 (Step S31). When the transmission of data within one memory area is finished, a variable Ds indicative of a distance which the driven member is driven by this moment during the Stress Removal Movement (hereinafter, referred to as an "Escape Movement Distance") is added by a multiplied value of "Tv" and "SR" which are included in the data read-out from the memory (Step S32).

The Escape Movement Distance Ds added by the value Tv is determined that whether or not it becomes a variable AD (hereinafter, referred to as an "Escape Movement Distance Threshold") or less, which is set according to a desired Escape Movement Distance (Step S33). If the value Ds has not become the value AD or larger, it is considered that the driven member has not been driven for the desired Escape Movement Distance, and returned to Step S32. On the other hand, if the value Ds has become value AD or larger, it is considered that the Stress Removal Process has been finished. Then the servo motors $M_2$, $M_3$, $M_4$, $M_5$, $M_6$, and $M_7$ driving axes 2, 3, 4, 5, 6, and 7 are stopped (Step S34), the value Ds is reset to "0" (Step S35), and the flag FSR is set to value "0" (Step S36). After all this, the whole process is terminated.

As described above, in the present embodiment, since the robot is stopped after a predetermined Stress Removal Movement is executed as the collision is detected, the members of the robot is not left pushed against the obstacle for too long. Therefore, the damages of the members are minimized.

Moreover, since the reference values AS(i) and ADS(i) for the collision detection are set based upon data obtained from each movement of the robot while the robot is actually executing specific tasks, an accurate collision detection is made possible in accordance with actual operational environment of the robot.

Furthermore, since each of the axes which is driving the driven member in a direction away from the obstacle when a collision is occurred is controlled to be driven in the same direction, it is possible to avoid aggravating a degree of damage, for example, which is suffered from re-pushing the driven member against the obstacle when reversing a driving direction of the axes.

The present invention is explained according to the above embodiment; however, the present invention is not limited to the embodiment and modified in various ways. For example, although it is explained using an example of a robot arm, application of the present invention is not limited to the robot arm, and it is possible to apply to various driving apparatus.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A drive-controlling method, comprising the steps of:
   storing a driving route of a robot arm being driven by a driver;
   detecting a collision of the robot arm with an obstacle, wherein a reference level of detecting the collision of the robot arm with the obstacle is set based on operational data of the driver which is obtained by actually driving the robot arm; and it is considered that the collision is detected when a current value or a rate of change in the current value of a servo motor driving the robot arm exceeds the reference level; and
   controlling the driver such that the robot arm leaves a predetermined distance from the obstacle based on the stored driving route of the robot arm before the collision is detected.

2. The drive-controlling method according to claim 1, wherein the robot arm has a plurality of axes which are driven by independent servo motors, and in the case that the collision is detected, a reversing process for driving the robot arm in an opposite direction from before is executed when a value of a logical current value subtracted by an actual current value of the servo motor for a certain axis shows an opposite sign from the logical current value, or a forwarding process for driving the robot arm in the same direction as before is executed when a value of a logical current value subtracted by an actual current value of the servo motor for a certain axis shows a same sign as the logical current value.

3. The drive-controlling method according to claim 2, wherein the reversing process is to control the robot arm to leave from the obstacle for a predetermined distance back along a predetermined section of the route.

4. The drive-controlling method according to claim 3, wherein the predetermined distance is set to be constant nevertheless of a speed of the robot arm before the collision is detected.

5. A drive-controlling apparatus, comprising:
- a route storing memory for storing a driving route of a robot arm being driven by a driver;
- a collision detector for detecting a collision of the robot arm with an obstacle, wherein a reference level of detecting the collision of the robot arm with the obstacle is set based on operational data of the driver which is obtained by actually driving the robot arm; and it is considered that the collision is detected when a current value or a rate of change in the current value of a servo motor driving the robot arm exceeds the reference level; and
- a controller for controlling the driver such that the robot arm leaves a predetermined distance from the obstacle based on the stored driving route of the robot arm before the collision is detected.

6. The drive-controlling apparatus according to claim 5, wherein the robot arm has a plurality of axes which are driven by independent servo motors, and in the case that the collision is detected, a reversing process for driving the robot arm in an opposite direction from before is executed when a value of a logical current value subtracted by an actual current value of the servo motor for a certain axis shows an opposite sign from the logical current value, or a forwarding process for driving the robot arm in the same direction as before is executed when a value of a logical current value subtracted by an actual current value of the servo motor for a certain axis shows same a sign as the logical current value.

7. The drive-controlling apparatus according to claim 6, wherein the reversing process is to control the robot arm to leave from the obstacle for a predetermined distance back along a predetermined section of the route.

8. The drive-controlling apparatus according to claim 7, wherein the predetermined distance is set to be constant nevertheless of a speed of the robot arm before the collision is detected.

9. A robot including an arm, a driver for driving said arm, and a drive controlling apparatus comprising:
- a route storing memory for storing a driving route of said arm being driven by said driver;
- a collision detector for detecting a collision of the arm with an obstacle, wherein a reference level of detecting the collision of the arm with the obstacle is set based on operational data of the driver which is obtained by actually driving the arm; and wherein it is considered that the collision is detected when a current value or a rate of change in the current value of a servo motor driving the arm exceeds the reference level; and
- a controller for controlling the driver such that the arm leaves a predetermined distance from the obstacle based on the stored driving route of the arm before the collision is detected.

10. The robot according to claim 9, wherein the arm has a plurality of axes which are driven by independent servo motors, and in the case that the collision is detected, a reversing process for driving the arm in an opposite direction from before is executed when a value of a logical current value subtracted by an actual current value of the servo motor for a certain axis shows an opposite sign from the logical current value, or a forwarding process for driving the arm in the same direction as before is executed when a value of a logical current value subtracted by an actual current value of the servo motor for a certain axis shows a same sign as the logical current value.

11. The robot according to claim 10, wherein the reversing process is to control the arm to leave from the obstacle for a predetermined distance back along a predetermined section of the route.

12. The robot according to claim 11, wherein the predetermined distance is set to be constant nevertheless of a speed of the arm before the collision is detected.

* * * * *

UNITED STATES PATENT AND TRADEMARK OFFICE
CERTIFICATE OF CORRECTION

PATENT NO.   : 6,429,617 B1                                              Page 1 of 1
DATED        : August 6, 2002
INVENTOR(S)  : Masatoshi Sano et al.

It is certified that error appears in the above-identified patent and that said Letters Patent is hereby corrected as shown below:

Column 9,
Line 31, please change "shows same a sign" to -- shows a same sign --.

Signed and Sealed this

Eleventh Day of March, 2003

JAMES E. ROGAN
*Director of the United States Patent and Trademark Office*